UNITED STATES PATENT OFFICE.

SAMUEL R. SCHOLES, OF BEAVER, AND RALPH F. BRENNER, OF ROCHESTER, PENNSYLVANIA, ASSIGNORS TO J. HOWARD FRY, OF ROCHESTER, PENNSYLVANIA.

PROCESS OF EXTRACTING POTASSIUM FROM POTASH-BEARING SILICATE MINERALS.

1,327,781.     Specification of Letters Patent.     Patented Jan. 13, 1920.

No Drawing.     Application filed May 10, 1917. Serial No. 167,694.

*To all whom it may concern:*

Be it known that we, SAMUEL R. SCHOLES and RALPH F. BRENNER, both citizens of the United States, respectively residing at Beaver and Rochester, both in the county of Beaver and State of Pennsylvania, have invented certain and useful Improvements in Processes of Extracting Potassium from Potash-Bearing Silicate Minerals; and we do hereby declare the following to be a full, clear, and exact descripton of the invention, such as will enable others skilled in the art to which it appertains to make and use the same.

This invention relates to a process of producing potassium carbonate from feldspar and other potash bearing minerals, and has for its object to extract the alkali metals present in a manner more efficient and at a less cost than those heretofore proposed.

With these and other objects in view the invention consists in the novel steps and combinations of steps constituting the process all as will be more fully hereinafter disclosed and particularly pointed out in the claims.

In order that the invention may be the more clearly understood it is said:—Certain potassium bearing rocks, specially feldspar, are generally believed to have been decomposed in nature during geologic ages, by the combined action of water and carbon dioxid, to form clays and alkali metal carbonates. But when such reactions are attempted in the laboratory they are found to be too slow to be of any practical utility.

This invention, on the other hand, provides a process of bringing about the above reactions in a short period of time by modifying the nature of the mineral before subjecting it to the action of hot water and carbon dioxid, as will now appear.

In carrying out the invention we finely divide the potash bearing mineral, as by crushing or grinding the same, and add thereto a quantity of hydrated potassium carbonate, or an equivalent amount of some other potassium compound, sufficient to supply about one equivalent of potassium oxid $K_2O$ to every two equivalents of silicon oxid $SiO_2$, present in the rock. These materials are thoroughly mixed, and are then melted down to a glass-like mass in any suitable pot, or furnace. This glassy mass is next brought to a fine state of sub-division, as by pouring it while still molten into water to shatter the mass, and then grinding the fragments in either a wet or dry condition in a suitable mill.

This finely ground product of fusion is next mixed with about two or three times its weight of water and is conveniently boiled in a suitable container for an hour or two while carbon dioxid gas is forced into and through the mixture. The heat may now be turned off, and carbon dioxid again forced through the mixture until test portions show no undecomposed silicates, or that the dissolved alkalis have reached a maximum.

When the silicates have been thus decomposed by the combined action of the carbon dioxid and water, either hot or cold, the compounds of aluminum and silicon present are found to be in the form of flocculent precipitates, translucent in appearance, and quite distinct from the opaque white particles of the ground fusion product from which they were derived.

The solution containing the potassium and the precipitates thus produced may be separated in the usual manner in a filter press, the desired alkali metal carbonates passing through said press in the filtrate and the hydrates of aluminum and silicon remaining behind as a filter cake, similar in composition and properties to clay. We find the separation to be quite complete, as only about 2% or less of the dried precipitates consists of alkali metal oxids, and less than 2% of the silicon and aluminum compounds pass through with the carbonate solutions.

The filtrate consisting chiefly of a solution of potassium carbonate, mixed with some sodium carbonate and containing some bi-carbonates, may next be evaporated, and the carbonates present recovered in a dry condition. In the case of feldspar minerals the total weight of the carbonates recovered is found to exceed by about 25% the total weight of carbonate added to the original material. The actual gain in potassium will depend of course upon the composition of the mineral in each case.

The carbonic acid gas used need not be in a pure state; in fact we find that the impure flue gases, suitably cooled, from a furnace or from a cement kiln, or other waste gases rich in $CO_2$ may be used to advantage in this process. Especially is this true when said waste gases contain potash as they often do, for example, from a cement kiln.

It will thus be seen that by following the procedure above outlined, potash bearing silicate minerals in general may be rendered partially soluble in water by first fusing the minerals with additional quantities of potassium compounds, and then the fused mass may be decomposed with carbon dioxid in the presence of water.

It will further be observed that the insoluble precipitates produced by this process are largely composed of the hydrates of aluminum and silica, mixed with the iron present in a state of combination, and that they resemble and have the properties of clay. Therefore they are useful in the manufacture of plastics of various kinds such as refractory articles in general, and fine abrasives. Said precipitates are also useful as raw materials for the making of certain kinds of glass.

It is obvious that those skilled in the art may vary the proportions and other details of the process without departing from the spirit of the invention, and therefore, we do not wish to be limited to the above disclosure except as may be required by the claims.

What we claim is:—

1. The process of extracting a potassium carbonate from a potassium bearing silicate which consists in finely dividing said silicate; adding a quantity of potassium carbonate sufficient to supply one equivalent of potassium oxid to each two equivalents of silicon dioxid present; melting the mixture thus produced to a glasslike mass; finely subdividing said glasslike mass; subjecting the finely divided glass like material thus obtained to the action of water while passing a gas containing carbon dioxid through the mixture; and continuing the latter operation until substantially the desired percentage of potassium carbonate has been dissolved out, substantially as described.

2. The process of extracting potassium carbonate and bicarbonate from a potassium containing feldspar rock, which consists in finely dividing said rock; adding thereto a hydrated potassium carbonate in a quantity sufficient to supply one equivalent of potassium oxid $K_2O$ to each two equivalents of silicon dioxid $SiO_2$ present; melting down the mixture thus obtained to a glass like mass to render the latter soluble; shattering and grinding said soluble mass to a state of fine subdivision; boiling the finely divided soluble glass like mass in water while passing an impure carbon dioxid gas $CO_2$ through the mixture to extract the combined potassium present and to convert the latter into carbonates; discontinuing the treatment with boiling water and continuing to subject the solution to the action of carbon dioxid gas until the desired percentage of alkali metal carbonates appear in the solution, and finally recovering said carbonates, substantially as described.

3. The process of extracting potassium salts from minerals containing potassium in an insoluble form comprising mixing the powdered mineral with a reagent capable when fused therewith to render the potassium amenable, said mineral and reagent being so proportioned that a glasslike mass will be formed, heating the mass until fusion takes place and all the volatile gases are driven off, grinding the fused mass and mixing it with water, treating it with carbon dioxid and separating the potassium carbonate thus formed from the mass.

In testimony whereof we affix our signatures, in presence of two witnesses.

SAMUEL R. SCHOLES.
RALPH F. BRENNER.

Witnesses:
G. KENNETH FRY,
WALTER R. IRVIN.